(12) United States Patent
Gutsol et al.

(10) Patent No.: US 8,173,075 B2
(45) Date of Patent: May 8, 2012

(54) DEVICE FOR GENERATION OF PULSED CORONA DISCHARGE

(75) Inventors: Alexander F. Gutsol, San Ramon, CA (US); Alexander Fridman, Marlton, NJ (US); Kenneth Blank, Philadelphia, PA (US); Sergey Korobtsev, Moscow (RU); Valery Shiryaevsky, Moscow (RU); Dmitry Medvedev, Moscow (RU)

(73) Assignee: Drexel University, Philadelphia, PA (US)

(*) Notice: Subject to any disclaimer, the term of this patent is extended or adjusted under 35 U.S.C. 154(b) by 425 days.

(21) Appl. No.: 12/373,618

(22) PCT Filed: Jul. 13, 2007

(86) PCT No.: PCT/US2007/073467
§ 371 (c)(1),
(2), (4) Date: Jan. 13, 2009

(87) PCT Pub. No.: WO2008/008958
PCT Pub. Date: Jan. 17, 2008

(65) Prior Publication Data
US 2010/0006419 A1    Jan. 14, 2010

Related U.S. Application Data

(60) Provisional application No. 60/807,472, filed on Jul. 14, 2006.

(51) Int. Cl.
*B01J 19/08* (2006.01)
(52) U.S. Cl. ......... 422/186.04; 422/186.05; 422/186.21; 204/164

(58) Field of Classification Search .................. None
See application file for complete search history.

(56) References Cited

U.S. PATENT DOCUMENTS

| 4,517,497 | A | * | 5/1985 | Malone .................. 315/241 R |
| 5,043,636 | A |   | 8/1991 | Klopotek et al. |
| 5,655,210 | A | * | 8/1997 | Gregoire et al. .............. 422/186 |
| 5,970,993 | A |   | 10/1999 | Witherspoon et al. |

FOREIGN PATENT DOCUMENTS
RU    2144257 C1    1/2000

OTHER PUBLICATIONS

Chang, Jen-shih et al. "Corona discharge processes." IEEE Transactions on Plasma Science (1991) 19 1152-1166.*
Edwards, C. B. et al. "Repetitive vacuum ultraviolet xenon excimer laser." Rev. Sci. Instrum. (1979) 50 1201-1207.*

* cited by examiner

*Primary Examiner* — Yelena G Gakh
*Assistant Examiner* — Christopher A Hixson
(74) *Attorney, Agent, or Firm* — Woodcock Washburn, LLP

(57) ABSTRACT

The invention is a method and system for the generation of high voltage, pulsed, periodic corona discharges capable of being used in the presence of conductive liquid droplets. The method and system can be used, for example, in different devices for cleaning of gaseous or liquid media using pulsed corona discharge. Specially designed electrodes and an inductor increase the efficiency of the system, permit the plasma chemical oxidation of detrimental impurities, and increase the range of stable discharge operations in the presence of droplets of water or other conductive liquids in the discharge chamber.

12 Claims, 2 Drawing Sheets

DEVICE FOR GENERATION OF PULSED CORONA DISCHARGE

CROSS-REFERENCE TO RELATED APPLICATIONS

This application is the National Stage of International Application No. PCT/US2007/073467 filed Jul. 13, 2007, which claims the benefit of U.S. Provisional Application No. 60/807,472, filed Jul. 14, 2006, the entire disclosure of each application is incorporated by reference herein.

STATEMENT OF GOVERNMENT RIGHTS

This invention was made with U.S. Government support under Contract Nos. DE-FG36-04GO14042 and DE-FC07-00ID13868 awarded by the Department of Energy. The government has certain rights in the disclosed invention(s).

BACKGROUND OF THE INVENTION

1. Field of the Invention

The invention relates to the field of environmental control technology. In particular the invention relates to a method and system for the generation of high voltage, pulsed, periodic corona discharge.

2. Description of the Related Technology

Pulsed corona discharge based systems are among the most promising approaches in the field of environmental control technology. Such systems are used for the cleaning of water, air, furnaces, fuel and vent gases. The systems are also used as electro-precipitators with pulsed power supplies, as well as for ozone generation. Further development of these systems is limited by the lack of cost-effective and reliable power supplies that can generate short high voltage pulses and that have the necessary characteristics for industrial applications. Methods for matching these power supplies with a non-linear load of pulsed corona discharge are also lacking. This matching is desirable in order to achieve reasonable energy input efficiency into the pulsed corona discharge.

Today most of the methods for pulsed corona discharge generation are based on the use of thyratrons, which are gas-filled hot-cathode electron tubes in which the grid controls only the start of a continuous current thus giving the tubes a trigger effect, or triggered spark gaps (with a third electrode or rotating electrodes). These methods have the following drawbacks: Industrial thyratrons, as well as triggered spark gaps, are relatively expensive and have a short life time as generators of short pulses. Moreover, use of thyratrons or triggered spark gaps demands additional power for thyratron cathode heating, or for the formation of control pulses (triggering) or the rotation of electrodes. This reduces the overall energy efficiency of the pulse generator.

The use of untriggered spark gaps that have the best time characteristics when generating single pulses in conventional methods with ballast (serial) resistors results in very large energy losses during charging of the discharge capacitor (Ohmic heating loss can be more than 50%). Furthermore, the typical untriggered spark gap cannot provide the high frequencies of pulse generation (1000 Hz and higher) that are necessary for commercial applications of the pulsed corona discharges such as gas cleaning, or ozone generation.

Russian patent no. 2144257 discloses a device that was developed for generation of short pulses of high voltage for ignition of pulsed-periodic electric discharges like pulsed corona discharges or pulsed barrier discharges. The device can generate high voltage pulses with extremely short rise times (up to 5-10 ns) with high pulse repetition frequencies (about 2000 Hz) and with a maximal energetic efficiency of the device (COP on the level of 90%). The device comprises a high voltage power supply, a discharge capacitor, and a high voltage commutation switch that connects a discharge capacitor and a load. The high voltage power supply comprises a main rectifier, a semiconductor converter, and one or more pulsed high voltage transformers that provide charging of the discharge capacitor by small portions that form in each operation of the converter, so that the frequency of charging pulses of the discharge capacitor is at least three times larger than the frequency of the high voltage communication switch operation. The high voltage communication switch is made as an untriggered spark gap in which one or both electrodes are made in the form of one or several pins, threads, needles, blades or other components with sharp edges, so that corona discharge appears on these edges when the voltage between the gap electrodes is still below the breakdown voltage.

The method used in this above device has one important drawback: The residual high voltage exists on the electrodes of the pulsed corona chamber between corona pulses. This voltage corresponds to an extinguishing voltage of a corona discharge. Because of this drawback this device cannot be used for the generation of a corona discharge in the presence of droplets of water (e.g. spray, fog) or other conductive liquids in the discharge chamber. This option is extremely important for most commercial applications of the pulsed corona discharge for gas cleaning to enable hetero-phase plasma chemical reactions.

Therefore, there exists a need for providing a method and system for the generation of high voltage, pulsed, periodic corona discharges capable of being used in the presence of conductive liquid droplets.

SUMMARY OF THE INVENTION

Accordingly, it is an object of certain embodiments of the invention to provide a method and system for the generation of high voltage, pulsed, periodic corona discharges capable of being used in the presence of conductive liquid droplets.

For a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1:
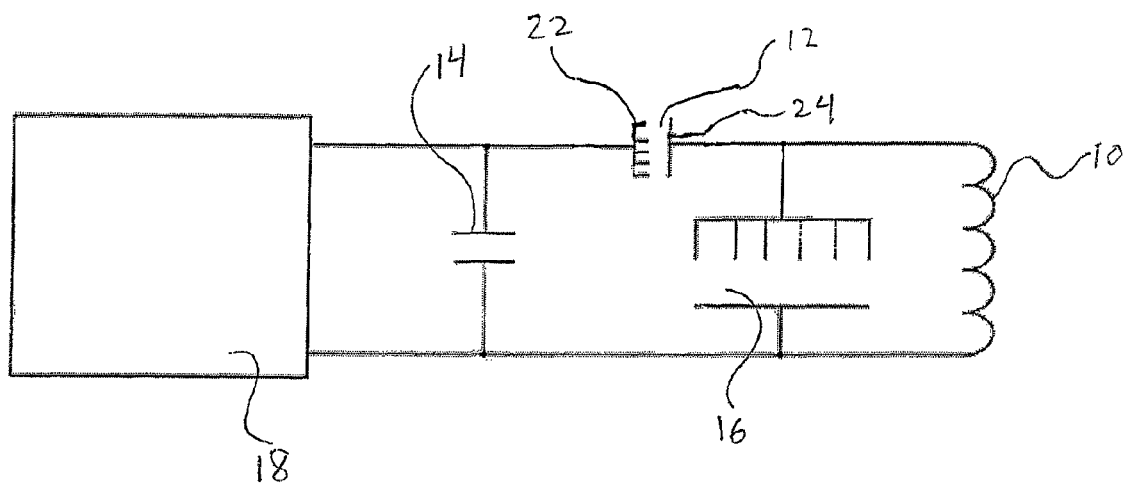
FIG. 1 shows a diagram of a system for supplying pulsed electric power to a pulsed corona discharge chamber.

The instant invention provides a method and system for the generation of high voltage, pulsed, periodic corona discharges capable of being used in the presence of conductive liquid droplets, while maintaining high-energy efficiency. The invention can be used, for example, in different devices for cleaning of gaseous or liquid media using pulsed corona discharges.

The result of the method and system is the formation of high voltage pulses with an extremely short rise time, for example, up to 5-10 nanoseconds, and with high pulse repetition frequency, for example, up to 1000-2000 Hz. The high voltage pulses facilitate maximum efficiency plasma chemical oxidation of detrimental impurities, and increase the range of stable discharge operations in the presence of droplets of water or other conductive liquids in the discharge chamber.

It is possible to achieve this using a device comprising a high voltage power supply 18 with limited output current (i.e. a high voltage rectifier provided with current limitation), a discharge capacitor 14, an untriggered spark gap 12 and a pulsed corona discharge chamber 16 with electrodes that are connected to inductor 10. Anode 22 may be fabricated as a bunch of conductive rods and cathode 24 may be a plate with flat surface.

Figure 2:
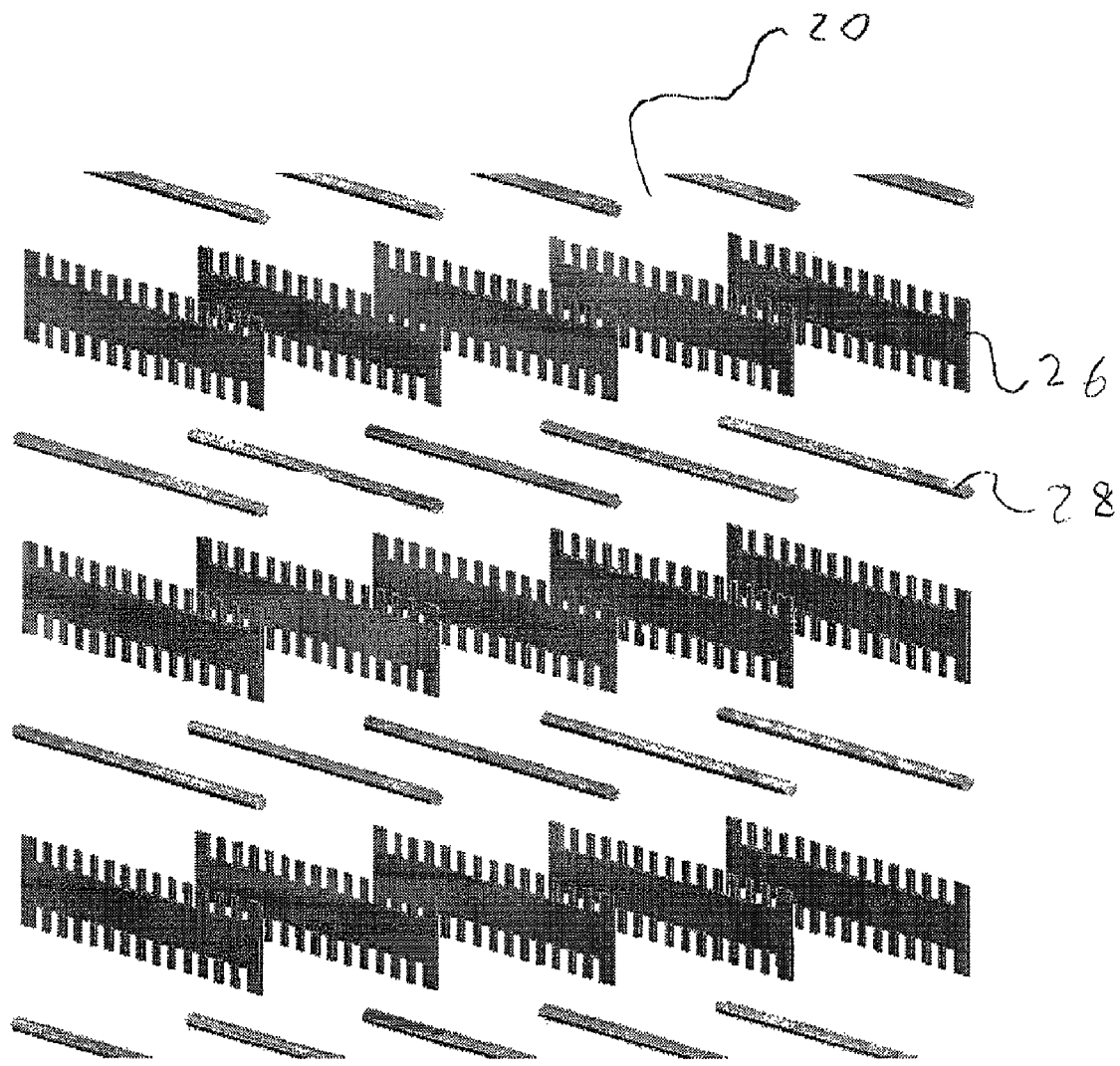
FIG. 2 shows a diagram of the electrodes of the pulsed corona discharge chamber.

Electrodes 20, shown in FIG. 2, are connected to the discharge chamber by inductor 10, shown in FIG. 1. In this method, inductor 10 removes the residual voltage from electrodes 20 of pulsed corona discharge chamber 16 and generates a current pulse that effectively switches off untriggered spark gap 12 that results in an increase of the system operation stability.

As shown in FIG. 2, discharge chamber electrodes 20 are designed to increase stability of pulsed corona discharge generation. Electrodes 20, as shown, are made as alternate rows of parallel plates 26 with sharp cogs and rods 28, or, alternatively, as round rods. Thus, electrodes 20 may be formed as plates provided with a series of protrusions along at least one side thereof. This electrode system is almost transparent for liquid spray or fog droplets and minimizes formation of continuous rivulets or streamlets of conductive liquid that may short-circuit the discharge, or spark gap 12. The invention thus encompasses various electrode designs that substantially eliminate formation of continuous streams of conductive liquid on the electrode and therefore various different shapes of electrodes can be employed as long as the electrodes meet this criteria.

The electrical device may be made according to FIG. 1. In a specific embodiment, the average corona plasma power may be 450 W, the capacitance (C) of capacitor 14 may be C=5 nF, and the inductance of inductor 10 may be L=50 mkH. The electrical efficiency of energy transfer from the charging capacitor 15 to the impulse corona discharge chamber 16 is 95%. The gap between electrodes 20 is d=25 mm; the distance between cogs $a_1$ on the positive electrode is equal to the width of the cogs $a_2$ and is equal to 1 cm; while the thickness of the positive electrode plates is $\delta \geq 2.5$ mm.

Generally, inductance should be chosen according to the equation:

$$100 \text{ ns} < (LC)^{1/2} < 1000 \text{ ns}$$

and the sizes of electrodes 20 should obey the following rules:

The thickness of the positive electrode is $\delta \geq 0.1$ d; distance between the plates of electrodes is D>d; the "saw" period $(a_1+a_2)$ is >0.5 d.

The present invention also encompasses a method for the generation of high voltage, pulsed, periodic corona discharges capable of being used in the presence of conductive liquid droplets. In the method, voltage is supplied to electrodes separated by a corona discharge gap to generate the pulsed corona discharge. The method further includes the step of removing residual voltage from said electrodes with an inductor. The electrodes are selected to substantially eliminate formation of continuous streams of conductive liquid on the electrode. The method may be carried out with an apparatus of the invention, as described above.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention.

What is claimed is:

1. A device for generating a pulsed corona discharge comprising:
    a power supply,
    at least two electrodes separated by a corona discharge gap,
    an inductor connected to said power supply and said electrodes, and
    an untriggered spark gap located in a connection between said inductor and said power supply;
    wherein at least one said electrode comprises at least one plate provided with a plurality of protrusions on at least one side of said plate and at least one said electrode comprises a rod or cylinder; and
    wherein the electrodes are arranged to substantially eliminate formation of a continuous stream of a conductive liquid on the electrodes.

2. A device as claimed in claim 1, further comprising a discharge capacitor.

3. A device as claimed in claim 2, wherein the inductor has an associated inductance L and the discharger capacitor has an associated capacitance C, such that $100 \text{ ns} < (LC)^{1/2} < 1000$ ns.

4. A device as claimed in claim 3, wherein a thickness δ of a positive electrode is $\delta \geq 0.1$ d, wherein d is a distance across the corona discharge gap.

5. A device as claimed in claim 1, wherein one said electrode comprises a plurality of plates provided with a plurality of protrusions on at least one side of said plates.

6. A device as claimed in claim 5, wherein a distance between said plates is greater than a distance of a gap between one said electrode which acts as a cathode and another said electrode which functions as an anode.

7. A device as claimed in claim 6, wherein a period of said protrusions on said plate is defined by the formula: $(a_1+a_2)>0.5$ d; wherein $a_1$ is a distance between two said protrusions, $a_2$ is a width of said protrusions, and d is a distance across the corona discharge gap.

8. A device as claimed in claim 1, wherein said power supply is a high voltage power supply and said device generates high voltage pulses with a rise time of 5-10 nanoseconds and a frequency of 1000-2000 Hz.

9. The device of claim 1, wherein the untriggered spark gap is located in a connection between said power supply and both said inductor and one of the at least two electrodes.

10. The device of claim 1, wherein the corona discharge gap contains a liquid spray or fog droplets.

11. A method for generating a pulsed corona discharge using the device of claim 2, comprising the steps of supplying a voltage to one of the at least two electrodes separated by the corona discharge gap via the untriggered spark gap, and removing residual voltage from said electrode with the inductor.

12. The method of claim 11, wherein the corona discharge gap contains a liquid spray or fog droplets.

* * * * *